F. C. AVERY.
VEHICLE TRANSMISSION.
APPLICATION FILED SEPT. 11, 1913.
1,147,669.
Patented July 20, 1915.
2 SHEETS—SHEET 2.
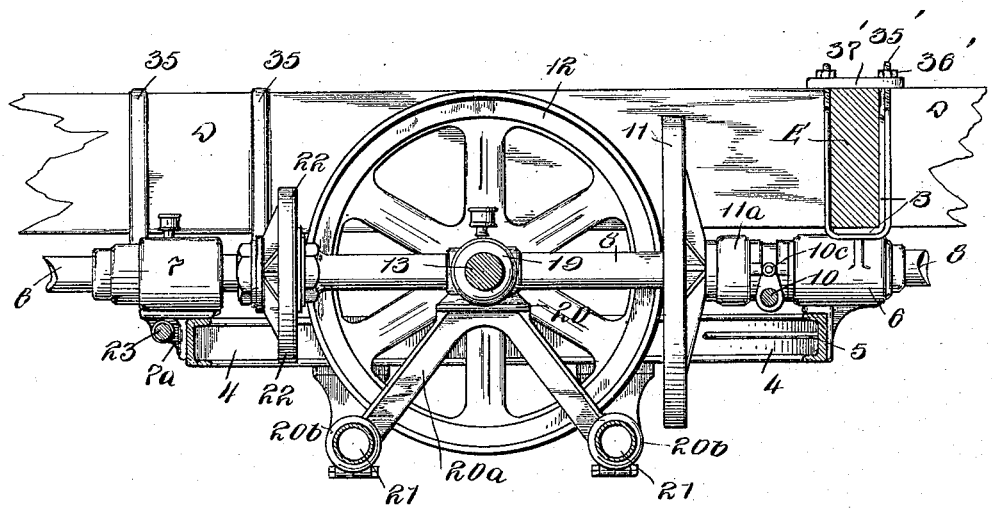
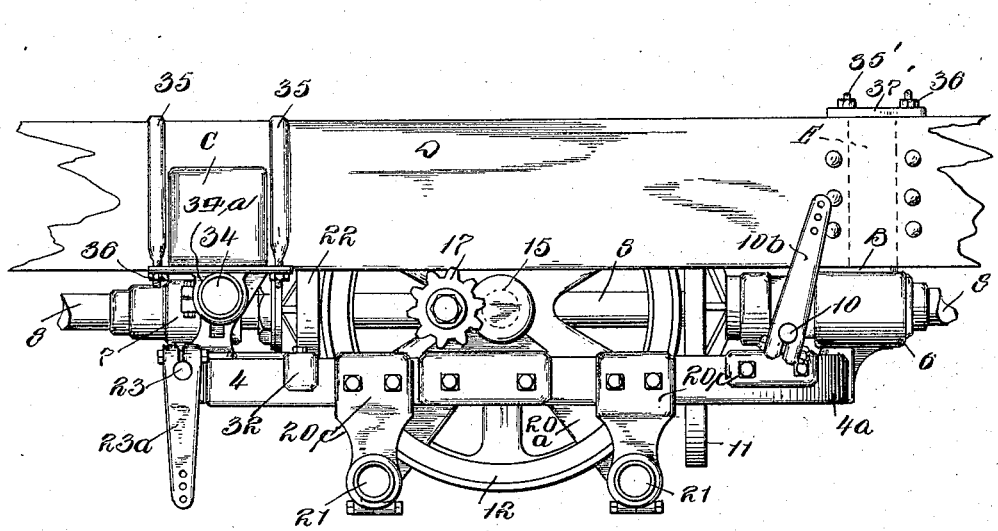

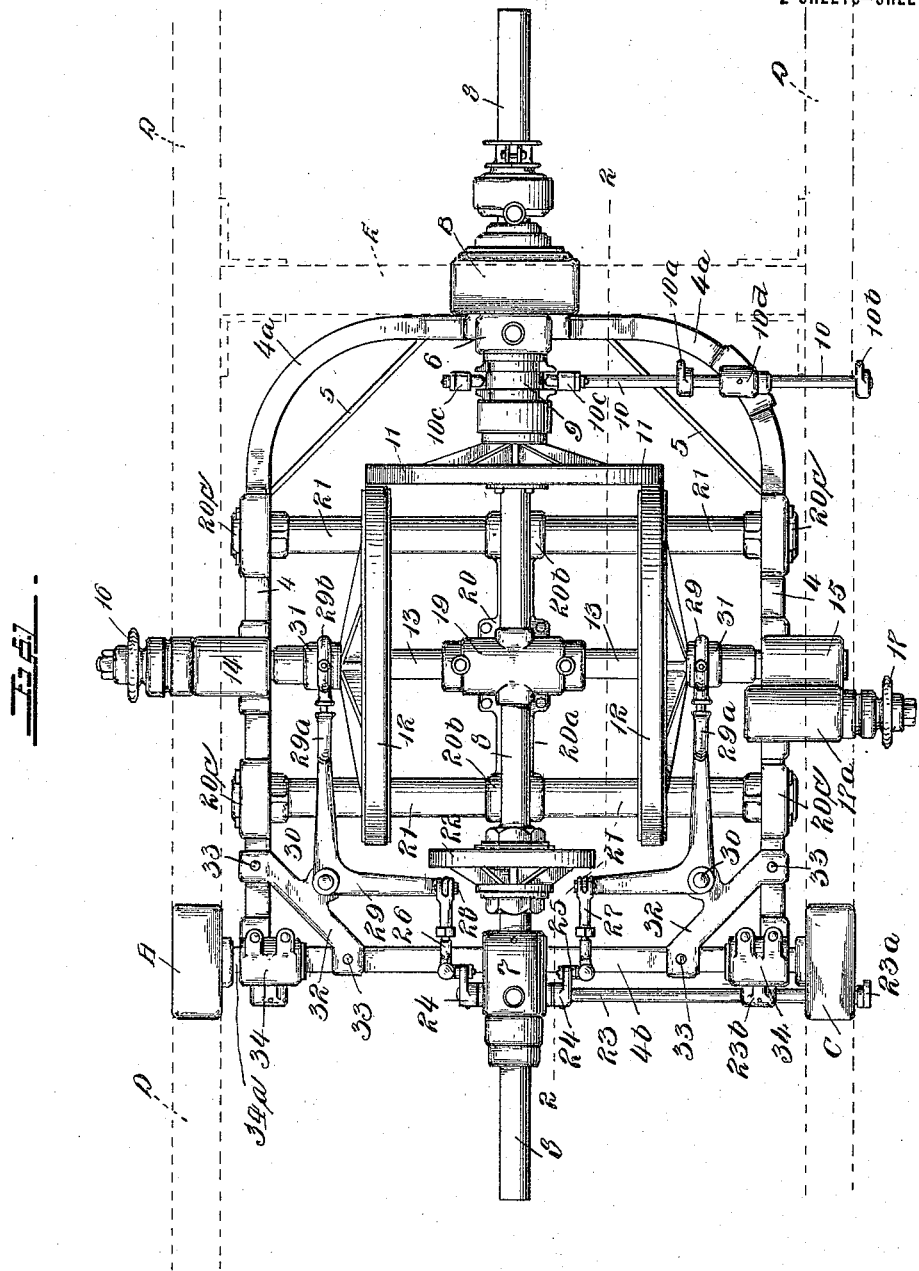

UNITED STATES PATENT OFFICE.

FREDERICK C. AVERY, OF CHICAGO, ILLINOIS.

VEHICLE TRANSMISSION.

1,147,669.  Specification of Letters Patent.  Patented July 20, 1915.

Application filed September 11, 1913. Serial No. 789,224.

*To all whom it may concern:*

Be it known that I, FREDERICK C. AVERY, citizen of the United States, residing at Chicago, in the county of Cook and State of Illinois, have invented certain new and useful Improvements in Three-Point Suspension for Motor-Vehicle Transmissions, of which the following is a specification.

My invention relates to the construction of motor vehicles, and especially to the method of flexibly suspending a frictional transmission in said vehicles.

The object of this invention is to provide a construction or means of attaching a transmission frame to a vehicle frame which will allow the vehicle frame to twist out of place under load without affecting the free movement of the transmission parts.

I attain the above object by the device illustrated in the accompanying drawings, in which:—

Figure 1 is a top plan view of my flexible transmission drive support, a portion of the vehicle frame being shown in dotted lines; Fig. 2 is a vertical section on line 2—2 of Fig. 1, and—Fig. 3 is a side elevation of my invention, a portion of the frame of the vehicle being shown.

Similar reference characters refer to similar parts throughout the several views.

The reference character 4 designates two parallel side beams of a transmission frame, the forward end thereof being bent on a curve to form the front $4^a$, and a cross-member $4^b$ is rigidly secured to the rear of said members 4. The forward portion $4^a$ of said frame, is reinforced by diagonal rods 5 extending to the two side members of said frame. A central bearing 6, on said forward portion $4^a$, and a central bearing 7, on the rear cross member $4^b$, support a power driven shaft 8, at the forward end of which, and adjacent the bearing 6, is a thrust bearing 9. A yoke $10^c$ engages the bearing 9 and a counter shaft 10 extends from said yoke $10^c$ beyond the frame work of the vehicle, and has a bearing $10^d$ on the transmission frame. Levers $10^a$ and $10^b$ are keyed to said shaft 10 at right angles thereto.

A driving disk 11, is rigidly secured to the thrust bearing 9, and so positioned that a pair of driving wheels 12, frictionally engage the inner surface of said disk. The wheels 12 are splined to stud shafts 13, mounted at right angles to the shaft 8, in end bearings 14 and 15 secured to said transmission frame. A sprocket wheel 16 is driven directly from the shaft 13, while a sprocket wheel 17 is driven indirectly through suitable gears inclosed and journaled in the bearing 15 and casing $17^a$, said gears not being shown. The inner ends of the two shafts 13, are journaled in a central bearing 19, said bearing being cast integral with, or bolted to, a supporting plate 20; arms or supports $20^a$, extend downwardly therefrom and are secured to two transverse tubular rods 21; the ends of said rods are supported by bearings $20^b$, which are permanently secured and extend downwardly at right angles to the sides of the transmission frame, two on each side of said frame. A reverse driving disk 22, rigidly secured to the above said shaft 8, and somewhat smaller in diameter than the disk 11, is located directly opposite to said latter disk, and directly in front of and adjacent to the bearing 7.

Journaled in said bearing 7, at $7^a$, (Fig. 2) and extending parallel with the rear of the frame 4, is a shaft 23, the other end of which passes through, and is journaled at $23^b$, to the lower portion of the support or bearing 34, its outer end being keyed to the lever $23^a$, which extends at right angles thereto (see Fig. 3). At the opposite end of said shaft 23, one on each side of the bearing $7^a$, are keyed two crank arms 24, at the outer ends of which are pivoted two rotatable links 25, from which extend adjustable links 26 and 27, their outer ends being pivoted at 28 to the arms of bell crank levers 29. Said levers in turn are pivoted at 30, to braces 32, which extend diagonally across the rear corners of the frame, and are secured thereto by bolts 33. The forward ends $29^a$ of the levers 29, terminate in clutch yokes $29^b$, the arms of which travel in guideways in the peripheries of collars or hubs 31, which are integral with, and form a part of, the friction wheels 12, which are splined to the stud shafts 13.

At the rear corners of the frame 4, are rigidly secured bearings 34. Through these bearings, extending outwardly, are stud shafts $34^a$, at the outer ends of which are permanently secured the horizontally disposed plates A and C respectively. The studs $34^a$ are so mounted in the bearings 34 as to permit free rocking or swinging movements by the plates A and C, and as said plates are secured to and supported by the parallel beams of the vehicle frame D, they will therefore permit of the vertical displacement of said frame without affecting said plates. Said vehicle frame is secured to the plates A and C by suitable straps 35, and nuts 36, said straps passing over said frames and being bolted through said plates, as shown in Fig. 3.

Extending vertically from the bearing 6, is a plate B, somewhat similar to the above mentioned plates A and C. A cross member E, of the vehicle frame, which is bolted to the two beams D, rests upon the bearing B, and is secured thereto by clip straps 35', and nuts 36', the straps passing through a plate 37, on top of the cross member E, and then under the flanges of the plate B. This connection effects a flexible connection between the vehicle frame and the transmission frame. The above said means of attaching the transmission frame to the vehicle frame, allows the latter considerable twist and vertical deflection under a heavy load without distorting the transmission and thereby effecting the free movement of the transmission parts.

I do not describe in detail the friction transmission shown, as same forms no part of my invention which relates to the means for connecting said transmission as an entirety to the vehicle frame, in which, while providing a strong and rigid support for the transmission members and their operating connections, I have also provided for the free swinging action of the said transmission as a whole relative to the vehicle frame by the rotatable bearings A, B and C.

I am aware that flexible suspension means have been provided between transmission gearings and motor vehicle frames, so that I do not broadly claim same but:—

Having thus described my invention what I claim is:—

1. In combination with a motor vehicle, comprising a frame or chassis, a rigid transmission frame, a transmission and its operating levers mounted upon and supported by said transmission frame, said transmission comprising two friction drive-wheels, separate shafts therefor, and a center bearing common to said shafts, and means for yieldingly supporting said transmission frame, consisting of three bearings attached to the frame of said vehicle, and rotatable connections between said transmission frame and said bearings.

2. In combination with a motor vehicle, a frictional transmission and its operating levers, said transmission comprising two friction drive-wheels, separate shafts therefor, and a center bearing common to said shafts, a rigid supporting frame for said transmission, a bearing member rigidly secured to the front of said frame, and rotatably connected to the frame of said vehicle, bearing members on the sides of said supporting frame, said bearing members being rotatably mounted on said vehicle frame.

3. In combination with a motor vehicle, comprising a frame or chassis, a rigid transmission frame, a frictional transmission with its operating levers mounted upon said transmission frame, said transmission comprising two friction drive-wheels, separate shafts therefor, and a center bearing common to said shafts, means for supporting said transmission frame consisting of a drive shaft bearing rigidly secured to the center of the forward portion of said transmission frame, and swingingly secured to the cross member of said chassis frame, and a bearing rotatably mounted on each side of said transmission frame and secured to the side members of said chassis.

In testimony whereof I affix my signature in the presence of two witnesses.

FREDERICK C. AVERY.

Witnesses:
G. W. HILTABRAND,
M. A. MILORD.